United States Patent [19]

Exarque et al.

[11] Patent Number: 4,680,775
[45] Date of Patent: Jul. 14, 1987

[54] DEVICE FOR CODING-DECODING A BINARY DIGITAL SIGNAL BIT STREAM FOR AN "OQPSK" DIGITAL MODULATOR-DEMODULATOR WITH FOUR PHASE STATES

[75] Inventors: Jean Exarque, Levallois-Perret; Michel Camand, Courbevoie, both of France

[73] Assignee: Societe Anonyme Dite, Levallois-Perret, France

[21] Appl. No.: 696,130

[22] Filed: Jan. 29, 1985

[30] Foreign Application Priority Data

Jan. 31, 1984 [FR] France ............................... 84 01466

[51] Int. Cl.$^4$ ............................................. H04L 27/18
[52] U.S. Cl. ........................................ 375/39; 375/54; 375/86
[58] Field of Search ........................ 375/38, 39, 42, 54, 375/56, 86; 370/20; 332/11 R; 340/347 DD; 371/43

[56] References Cited

U.S. PATENT DOCUMENTS

| | | | |
|---|---|---|---|
| 3,522,537 | 8/1970 | Boughtwood | 375/39 |
| 3,924,186 | 12/1975 | Gordy et al. | 375/54 |
| 3,978,406 | 8/1976 | Matsumoto et al. | 375/54 |
| 4,530,094 | 7/1985 | Sewerinson | 375/56 |

*Primary Examiner*—Benedict V. Safourek
*Attorney, Agent, or Firm*—Sughrue, Mion, Zinn, Macpeak and Seas

[57] ABSTRACT

A coder-decoder device for OQPSK signals with four phase states comprises a coder for converting a binary signal bit stream $T_n$ into two digital bit streams $X_n$ and $Y_n$ and a decoder for restoring the digital bit stream $T_n$ from the digital bit streams $X_n$ and $Y_n$ applied to its inputs. The coder comprises a first logic circuit for assigning to each bit of the bit stream $X_n$ the binary value 1 or 0 in accordance with the logic equation $$X_n = (T_n{}^* + H_n/2)^* \oplus X_{n-1}$$

where $H_n/2$ designates synchronization pulses in phase with the bits of the bit stream $T_n$. A second logic circuit assigns to each bit of the bit stream $Y_n$ the binary value 1 or 0 in accordance with the logic equation $$Y_n = T_n \oplus X_n \oplus X_{n-1} \oplus Y_{n-1}.$$

The decoder comprises a third logic circuit which assigns to each bit of the restored bit stream $T_n$ the binary value in accordance with the following logic equation:

$$T_n = X_n \oplus X_{n-1} \oplus Y_n \oplus Y_{n-1}.$$

4 Claims, 6 Drawing Figures

DEVICE FOR CODING-DECODING A BINARY DIGITAL SIGNAL BIT STREAM FOR AN "OQPSK" DIGITAL MODULATOR-DEMODULATOR WITH FOUR PHASE STATES

BACKGROUND OF THE INVENTION

1. Field of the invention

The present invention concerns a device for coding-decoding a binary digital signal bit stream for an "OQPSK" digital modulator-demodulator with four phase states.

It applies more particularly to the implementation of modulation and demodulation stages of digital radio transmitter-receivers designed to transmit binary digital bit streams utilizing the modulation method with four phase states known as "Offset Quadrature Phase Shift Keying" ("OQPSK").

2. Description of the Prior Art

It is known to place on the input side of each modulator of a digital radio transmitter operating in "OQPSK" mode a demultiplexer whose function is to divide the binary digital bit stream applied to the input of the modulation stage into two digital bit streams with a bit rate equal to half the bit rate of the digital bit stream of the signals applied to the input and a transition coder with the objective of grouping in pairs the binary symbols or consecutive bits of the signal to be transmitted in order to obtain a representation of the signal in a quaternary code of which each state is utilized in the modulator to phase modulate a fixed frequency signal. As a general rule, the fixed frequency signal is phase-shifted by $\pi/2$ in the modulator to form two carriers phase-shifted $\pi/2$ relative to one another. The carriers obtained are respectively applied to the first modulation inputs of two ring modulators of which the second inputs receive, in the case of one of them, the odd ranked bits of the digital bit stream applied to the input, the duration being extended by twice the duration of a symbol of the digital bit stream, and, in the case of the other of them, the even ranked bits of the digital bit stream applied to the input, their duration also being extended by twice the duration of a symbol. The outputs of the ring modulators are applied to the inputs of an adder which, in accordance with the four possible states resulting from the association of two even and odd bits, delivers a signal of frequency F phase-shifted by $(2k+1)\pi/4$ relative to the fixed frequency signal.

At the receiving end, the quaternary modulation phases of the message are recovered using a phase demodulator which carries out a first multiplication of the recovered carrier with the received phase modulated signals and a second multiplication of the recovered carrier phase-shifted by $\pi/2$ with the received phase modulated signals. The results of these multiplications are applied to the input of a decoder followed by a multiplexer which reconstitutes the original binary digital bit stream applied to the input of the modulation stage.

The utilization of coder-decoders of the aforementioned type in fixed radio stations does not present any problems. On the other hand, when they equip mobile relay stations, it is necessary to provide relatively complex and expensive doubt resolving devices to reconstitute the symbols of the transmitted messages, since in this case, especially when the relay station first goes into service, there are always uncertainties of at least 90° or $\pi/2$ radians with regard to the phase of the recovered carrier and several uncertainties of 180° or $\pi$ radians due to the translation of the frequency of the received carrier into an intermediate frequency which takes place in the receive stage preceding the demodulation stage of the receiver, this translation being effectively accompanied in phase modulation by an inversion of the spectrum of the demodulated carrier according to whether the intermediate frequency is obtained by means of a heterodyne frequency higher than or lower than the frequency of the carrier transmitted by the radio channel.

The objective of the invention is to alleviate the aforementioned disadvantages.

SUMMARY OF THE INVENTION

To this end, the invention consists in a device for coding-decoding a binary digital signal bit stream for an OQPSK digital modulator-demodulator with four phase states of the kind in which a binary digital signal bit stream with bit rate D is applied in phase with synchronization clock pulses to the input of a coder which produces two digital bit streams with bit rate D/2 at respective first and second inputs of a modulator and a decoder at the output of a demodulator restores a binary digital bit stream with bit rate D, in which device a coder comprises a circuit adapted to divide by 2 the frequency of synchronization clock pulses so as to produce synchronization pulses having a period twice that of said synchronization clock pulses, a first logic circuit having inputs connected to receive the bits of a digital bit stream with bit rate D and said synchronization pulses in phase with each bit of said digital bit stream and an output adapted to be connected to a first input of a modulator and to deliver each bit of a first digital bit stream with bit rate D/2, said first logic circuit comprises means for assigning each bit of said first digital bit stream with bit rate D/2 the binary value 1 or 0 in accordance with the following logic equation:

$$X_n = \overline{(T_n^* + H_n/2)^*} \oplus X_{n-1}$$

in which equation:

$X_n$ represents the state of the nth bit of the first digital bit stream with bit rate D/2, $T_n^*$ represents the complement of the state of the nth bit of the digital bit stream with bit rate D, $+$ represents the operator "OR", $H_n/2$ represents the state of the nth synchronization pulse;

$\overline{(T_n^* + H_n/2)}$ represents the complement of the function $(T_n^* + H_n/2)$, $\oplus$ represents the operator "exclusive-OR", $X_{n-1}$ represents the state of the (n−1)th bit of the first digital bit stream with bit rate D/2, a second logic circuit has an input connected to receive the bits of the digital bit stream with bit rate D and an output adapted to be connected to a second input of said modulator and to deliver the bits of a second digital bit stream with bit rate D/2, said second logic circuit is connected to the output of said first logic circuit and comprises means adapted to assign to each bit of said second digital bit stream with bit rate D/2 the binary value 1 or 0 in accordance with the following logic equation:

$$Y_n = T_n \oplus X_n \oplus X_{n-1} \oplus Y_{n-1}$$

in which equation:

$Y_n$ represents the state of the nth bit of the second digital bit stream with bit rate D/2, $T_n$ represents the state of the nth bit of the digital bit stream with bit rate D, $X_{n-1}$ and $Y_{n-1}$ respectively represent the states of the (n−1)th bits of said first and second digital bit streams with bit rate D/2, a decoder comprises a third logic circuit adapted to restore at the output of said decoder said digital bit stream with bit rate D formed from said first and second digital bit streams with bit rate D/2 as demodulated by a demodulator, and said third logic circuit comprises means adapted to assign to each restored bit the binary value 1 or 0 in accordance with the following equation:

$$T_n = X_n \oplus X_{n-1} \oplus Y_n \oplus Y_{n-1}$$

The principal advantage of the device in accordance with the invention is that it provides for resolving the eight possible phase ambiguities which arise on demodulation and which are caused by the uncertainties as to the phase of the recovered carrier and by the process of translating the carrier frequency to the intermediate frequency used, according to whether this translation produces an intermediate frequency by means of a heterodyne frequency higher than the frequency of the carrier transmitted by the radio channel or lower than the carrier frequency. Another advantage is that it is simple to implement and results in a device of low power consumption. Simplification is achieved in particular by virtue of the fact that the demultiplexing or multiplexing functions as well as the coding and decoding functions are implemented simultaneously and integrated into the coder-decoder in accordance with the invention. Applied to a digital modulator-demodulator, the invention also provides for considerably reducing the number of interfaces between the coder-decoder device and the modulation and demodulation device.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

Figure 1:
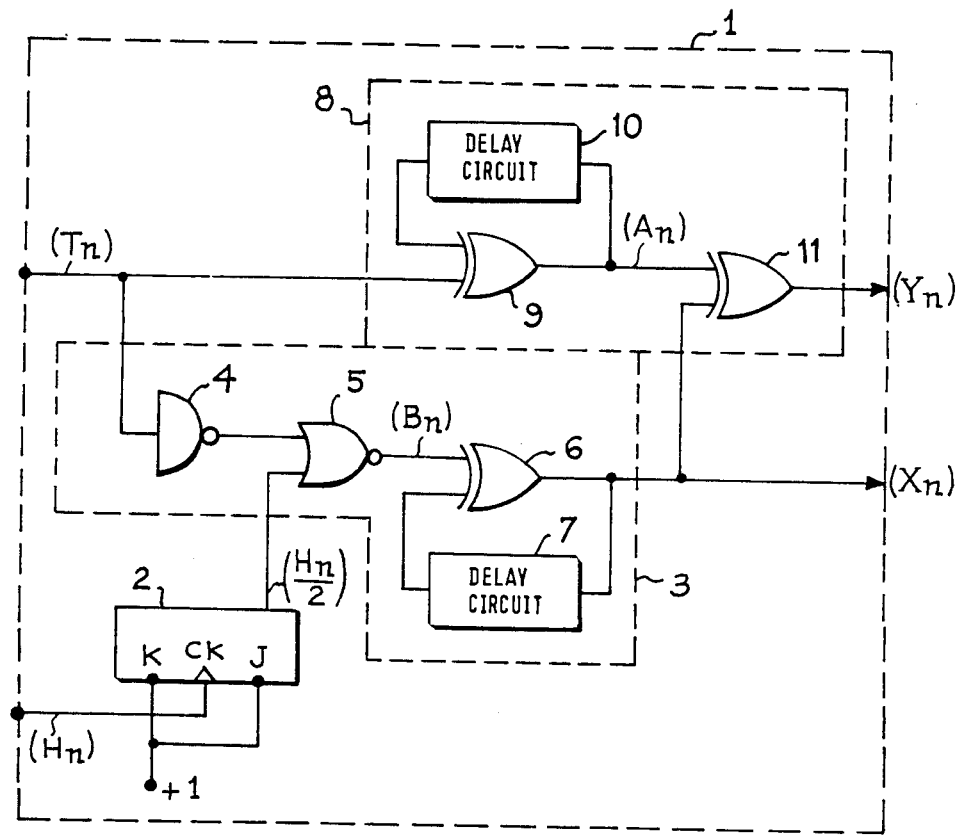
FIGS. 1 and 2 show a coder-decoder device in accordance with the invention.

The coder in accordance with the invention represented at 1 in FIG. 1 within a dashed line rectangle comprises a circuit 2 for dividing by 2 clock pulses ($H_n$) for synchronizing a digital signal bit stream ($T_n$) of bit rate D applied to the input of the coder, a first logic circuit 3 comprising an inverting amplifier 4, a "NOR" gate 5, an "exclusive-OR" gate 6 and a delay circuit 7, and a second logic circuit 8 comprising an "exclusive-OR" gate 9, a delay circuit 10 and an "exclusive-OR" gate 11. The digital signal bit stream ($T_n$) to be coded by the coder 1 is applied, on the one hand, to the input of the inverting amplifier 4 and, on the other hand, to a first input of the "exclusive-OR" gate 9. The "NOR" gate 5 has two imputs of which the first is connected to the output of the inverting amplifier 4 and the second is connected to the output of the divider by 2 circuit 2. The "exclusive-OR" gate 6 has two inputs, a first of which is connected to the output of the "NOR" gate 5 and the second of which is connected to the output of the "exclusive-OR" gate 6 through the delay circuit 7 which transmits to the second input of the "exclusive-OR" circuit 6 the state of its output delayed by the duration of one bit of the input digital bit stream ($T_n$). The output of the "exclusive-OR" gate 6 produces a digital signal binary bit stream ($X_n$) and constitutes the first output of the coder 1.

The "exclusive-OR" gate 9 has two inputs, a first of which receives the digital bit stream of the signals to be coded and the second of which is connected to its output through the delay circuit 10. The "exclusive-OR" gate 11 also has two inputs, a first of which is connected to the output of the "exclusive-OR" gate 9 and the second of which is connected to the output of the "exclusive-OR" gate 6 of the first logic circuit 3. The output of the "exclusive-OR" gate 11 constitutes the second output of the coder 1 and produces the second digital bit stream ($Y_n$) of bit rate D/2 equal to half the bit rate of the digital bit stream ($T_n$) applied to the input of the coder 1.

Figure 2:
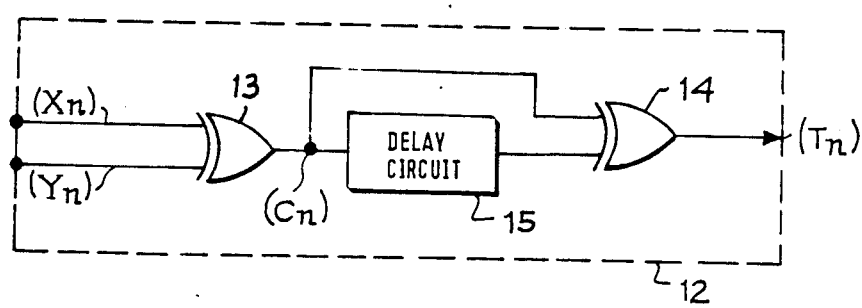

The decoder in accordance with the invention is represented at 12 in FIG. 2 within a dashed line rectangle and comprises an "exclusive-OR" gate 13 the output of which is connected, on the one hand, directly to a first input of an "exclusive-OR" gate 14 and, on the other hand, to a second input of the "exclusive-OR"/gate 13 through a delay circuit 15 imposing a delay corresponding to the duration $\theta$ of one bit of the digital bit stream ($t_n$). The digital bit streams ($X_n$) and ($y_n$) obtained at the outputs of the coder 1 are respectively applied in the receive decoder 12 to first and second inputs of the "exclusive-OR" gate 13. The output of the "exclusive-OR" gate 14 restores the digital bit stream ($T_n$) applied to the input of the transmit coder 1.

The operation of the coding and decoding device in accordance with the invention will now be described with reference to the timing diagrams represented in FIGS. 3 and 4.

Figure 3:
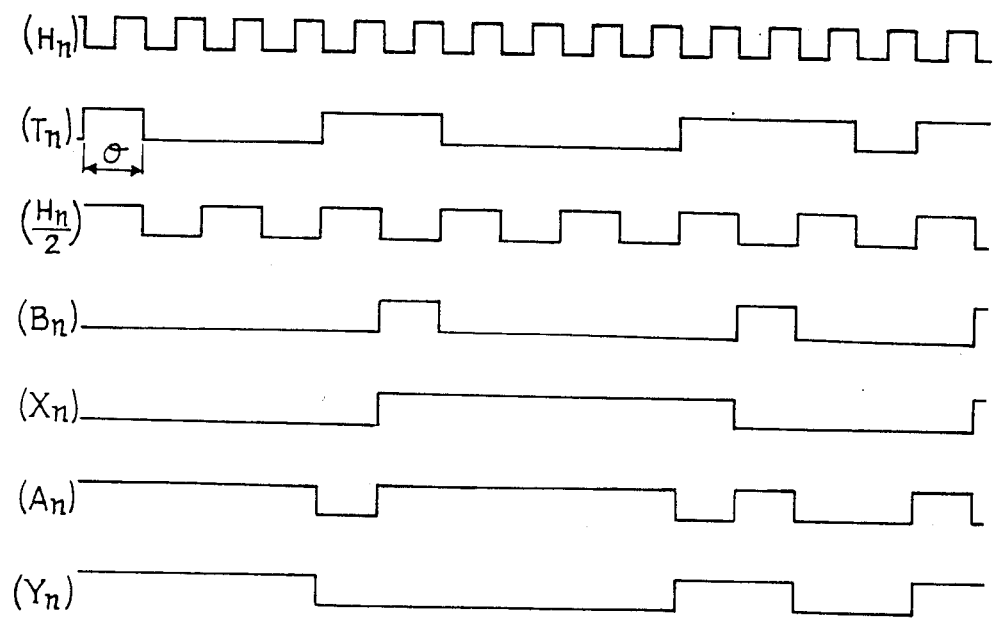
FIG. 3 shows a timing diagram illustrating the operation of the coder shown in FIG. 1.
Figure 4:
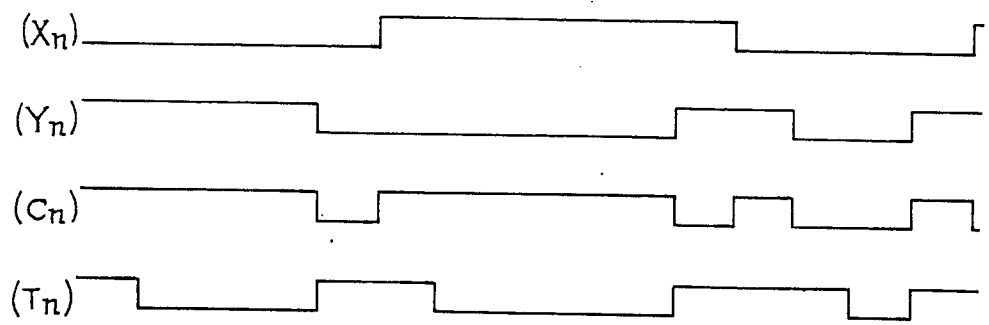
FIG. 4 shows a timing diagram illustrating the operation of the decoder show in FIG. 2.

The diagram of FIG. 3 illustrates the reaction of the coder to a digital signal bit stream ($T_n$) applied to the inputs of the inverting amplifier 4 and the gate 9. Each symbol or bit of the digital signal bit stream ($T_n$) has a duration $\theta$ and is applied in phase with the synchronization clock signals ($H_n$) and ($H_n/2$) applied respectively to the inputs of the circuit 2 and the "NOR" gate 5. The signals ($A_n$) and ($B_n$) represented are the signals respectively obtained at the outputs of the gates 9 and 5. Each of the bits $A_n$ or $B_n$ of the signals ($A_n$) or ($B_n$) takes the binary value 1 or 0 in accordance with the following equations are true $$A_n = A_{n-1} \oplus T_n$$

and $$B_n = (H_n/2 + T_n^*)^*$$

in which equations:

$A_n$ and $B_n$ represent the output states of the gates 9 and 5 at clock time $H_n$, $A_{n-1}$ represents the output state of the gate 9 at clock time $H_{n-1}$, $\oplus$ represents the "exclusive-OR" operator, and

* represents the "complement" operator.

The bits $X_n$ and $Y_n$ of the signals $(X_n)$ and $(Y_n)$ take the binary value 1 or 0 when the following equations $$X_n = X_{n-1} \oplus (H_n^*/2 + T_n^*)^*$$

and $$Y_n = A_n \oplus X_n$$

FIG. 2 shows the reactions of the decoder 12 of FIG. 2 to the signals $(X_n)$ and $(Y_n)$ coded by the coder of FIG. 1. The signal $(C_n)$ represented is the output signal of the "exclusive-OR" operation applied to the signals $(X_n)$ and $(Y_n)$, each bit $C_n$ taking the binary value "1" or "0" in accordance with the following equation $$C_n = X_n \oplus Y_n$$

The signal $(T_n)$ represented is the signal obtained at the output of the "exclusive-OR" gate 14 resulting from the "exclusive-OR" operation applied to the bits $C_n$ and $C_{n-1}$, each bit $T_n$ taking the binary value "1" or "0" in accordance with the following equation true $$T_n = C_n \oplus C_{n-1}$$

Note on FIG. 2 that the signal $(T_n)$ obtained at the output of the corresponding gate 14 really corresponds to the digital signal bit stream $(T_n)$ applied to the input of the coder 1. This verification can be carried out in a more general manner by solving the logic equations for the circuits shown in FIGS. 1 and 2.

Figure 5:
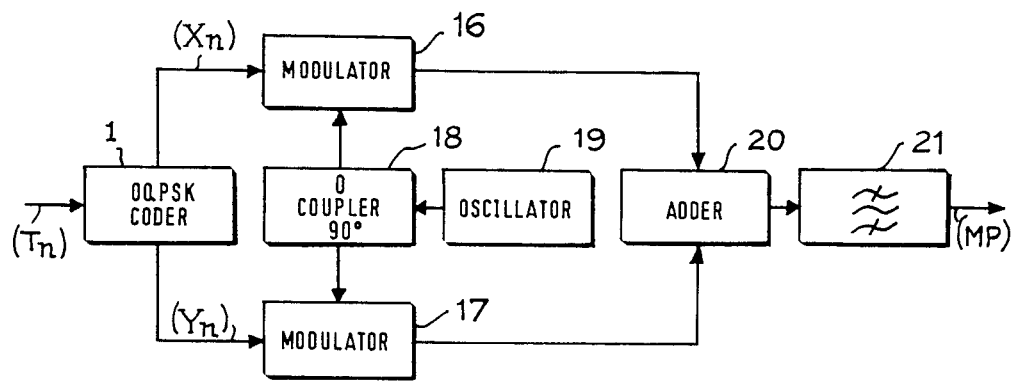
FIGS. 5 and 6 show the application of the coder-decoder device to a modulator-demodulator with four phase states.
Figure 6:
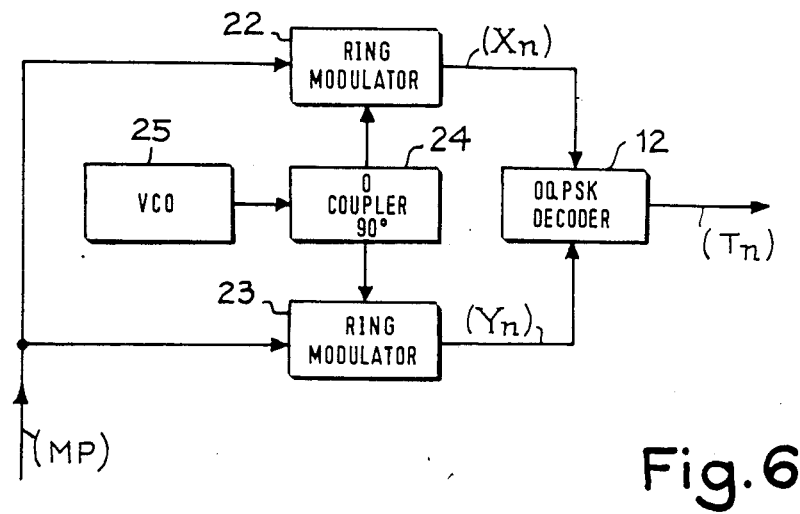

The application of the coder-decoder in accordance with the invention to an OQPSK modulation system is represented in FIGS. 5 and 6. FIG. 5 represents a radio transmit modulator. The outputs of the coder 1 of the invention producing the signals $(X_n)$ and $(Y_n)$ are directly connected to first inputs of ring modulators 16 and 17 of which second inputs are respectively connected to the in-phase and phase-quadrature outputs of a coupler 18 excited by an oscillator 19. The outputs of the modulators 16 and 17 are respectively connected to first and second inputs of an adder circuit 20 the output of which is connected to the input of a bandpass filter 21. The output of the bandpass filter 21 passes the phase modulated signals (MP) to the input stage of the radio transmitter (not shown).

The receive demodulator is represented in FIG. 6. The phase modulated signals from the filter 21 of FIG. 5 passed through the transmit stage of the transmitter are received by the demodulator of FIG. 6 and applied to the respective first inputs of two demodulators 22 and 23. The demodulators 22 and 23 are excited on second inputs by the phase-quadrature and in-phase outputs of a coupler 24 driven by a voltage controlled oscillator 25. The demodulators 22 and 23 apply to the respective inputs of the decoder 12 in accordance with the invention the demodulated signals $(X_n)$ and $(Y_n)$ and the digital bit stream $(T_n)$ is restored at the output of the decoder 12.

It will be understood that various changes in the details, materials and arrangements of parts which have been herein described and illustrated in order to explain the nature of the invention may be made by those skilled in the art within the principle and scope of the invention as expressed in the appended claims. Specifically, other logic structures functionally equivalent to the structures of the decoder 1 and the decoder 12 employed in order to describe the invention may be used instead. Such structures may be deduced by determining the logical eqivalents of the functions of the circuits constituting the coder 1 and the decoder 12.

There is claimed:

1. Device for coding and decoding a binary signal digital bit stream for an OQPSK digital circuit having a modulator and demodulator with four phase states of the kind in which a binary digital signal bit stream with bit rate D is applied in phase with synchronization clock pulses to the input of a coder which produces two digital bit streams with bit rate D/2 at respective first and second inputs of said modulator and a decoder at the output of said demodulator restores a binary digital bit stream with bit rate D, in which device said coder comprises a circuit adapted to divide by 2 frequency of synchronization clock pulses so as to produce synchronization pulses having a period twice that of said synchronization clock pulses, a first logic circuit having inputs connected to receive the bits of said digital bit stream with bit rate D and said synchronization pulses in phase with each bit of said digital bit stream and an output for connection to said first input of said modulator and to deliver each bit of a first digital bit stream with bit rate D/2, said first logic circuit comprises means for assigning each bit of said first digital bit stream with bit rate D/2 the binary value 1 or 0 in accordance with the following logic equation:

$$X_n = (T_n^* \oplus H_n/2)^* \oplus X_{n-1}$$

$X_n$ represents the state of the nth bit of the first digital bit stream with bit rate D/2, $T_n^*$ represents the complement of the state of the nth bit of the digital bit stream with bit rate D, = represents the operator "OR", $H_n/2$ represents the state of the nth synchronization pulse, $(T_n^* + H_n/2)^*$ represents the complement of the function $(T_n^* + H_n/2)$, $\oplus$ represents the logic operator "exclusive-OR", $X_{n-1}$ represents the state of the (n−1)th bit of the first digital bit stream with bit rate D/2, a second logic circuit has an input connected to receive the bits of the digital bit stream with bit rate D and an output for connection to a second input of said modulator and to deliver the bits of a second digital bit stream with bit rate D/2, said second logic circuit is connected to the output of said first logic circuit and comprises means for assigning to each bit of said second digital bit stream with bit rate D/2 the binary value 1 or 0 in accordance with the following logic equation:

$$Y_n = T_n \oplus X_n \oplus X_{n-1} \oplus Y_{n-1}$$

in which equation:

$Y_n$ represents the state of the nth bit of the second digital bit stream with bit rate D/2, $T_n$ represents the state of the nth bit of the digital bit stream with bit rate D, $X_{n-1}$ and $Y_{n-1}$ respectively represent the states of the (n−1)th bits of said first and second digital bit streams with bit rate D/2, said decoder comprises a third logic circuit for restoring at the output of said decoder said digital bit stream with bit rate D formed from said first and second digital bit streams with bit rate D/2 as demodulated by said demodulator, and said third logic circuit comprises means for assigning to each restored bit the binary value 1 or 0 in accordance with the following equation:

$$T_n = X_n \oplus X_{n-1} \oplus Y_n \oplus Y_{n-1}.$$

2. Device according to claim 1, wherein said first logic circuit comprises an inverter circuit having an input connected to receive each bit of said digital bit stream with bit rate D, a two-input NOR gate having a first input connected to a first output of said inverter circuit and the second input connected to the output of said divide by 2 circuit, and a first two-input exclusive-OR gate having a first input connected to the output of said NOR gate and the second input connected to its output through a delay circuit whereby said second input receives the output of said first exclusive-OR gate delayed by the duration of one bit of said input digital bit stream, the output of said first exclusive-OR gate constituting the output of said first logic circuit.

3. Device according to claim 1, wherein said second logic circuit comprises a second two-input exclusive-OR gate having a first input connected to receive each bit of said digital bit stream with bit rate D and the second input connected to its output through a delay circuit whereby said second input receives the output of said second exclusive-OR gate delayed by the duration of one bit of said digital bit stream with bit rate D and a third two-input exclusive-OR gate having a first input connected to the output of said second exclusive-OR gate and the second input connected to the output of said first logic circuit.

4. Device according to claim 1, wherein said decoder comprises a fourth two-input exclusive-OR gate having a first input connected to receive said first digital bit stream with bit rate D/2 from said demodulator and the second input connected to receive said second digital bit stream with bit rate D/2 from said demodulator and a fifth two-input exclusive-OR gate having a first input connected to the output of said fourth exclusive-OR gate directly and the second input connected to the output of said fourth exclusive-OR gate through a delay circuit imposing a delay equal to the duration of one bit of said input digital bit stream, the output of said fifth exclusive-OR gate constituting the output of said decoder.

* * * * *